United States Patent
Saint-Marc et al.

(10) Patent No.: US 11,542,010 B2
(45) Date of Patent: Jan. 3, 2023

(54) AIRCRAFT PORTION COMPRISING A SUSPENDED ITEM OF FURNITURE EQUIPMENT

(71) Applicant: AIRBUS OPERATIONS (S.A.S.), Toulouse (FR)

(72) Inventors: Laurent Saint-Marc, Montaigut sur Save (FR); Bernard Guering, Montrabe (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 422 days.

(21) Appl. No.: 16/703,733

(22) Filed: Dec. 4, 2019

(65) Prior Publication Data
US 2020/0180768 A1 Jun. 11, 2020

(30) Foreign Application Priority Data
Dec. 5, 2018 (FR) ...................... 1872368

(51) Int. Cl.
*B64D 11/04* (2006.01)
*B64D 11/02* (2006.01)
*B64D 11/00* (2006.01)

(52) U.S. Cl.
CPC .............. *B64D 11/04* (2013.01); *B64D 11/02* (2013.01); *B64D 2011/0046* (2013.01)

(58) Field of Classification Search
CPC . B64D 11/04; B64D 11/02; B64D 2011/0046; B64D 11/0697; B64D 11/0698; B64D 2011/0084
See application file for complete search history.

(56) References Cited

U.S. PATENT DOCUMENTS

| | | | |
|---|---|---|---|
| 2008/0112753 A1 | 5/2008 | Tubbs et al. | |
| 2014/0196206 A1* | 7/2014 | Savian | E04H 1/1216 4/664 |
| 2017/0297717 A1* | 10/2017 | Moran | B64D 11/003 |
| 2018/0229844 A1* | 8/2018 | White | B64C 1/406 |
| 2019/0193871 A1* | 6/2019 | Benthien | B64F 5/00 |

FOREIGN PATENT DOCUMENTS

| | | |
|---|---|---|
| EP | 2 436 599 | 4/2012 |
| EP | 3 231 705 | 10/2017 |
| WO | 2017/021142 | 2/2017 |

OTHER PUBLICATIONS

French Search Report and Written Opinion for FR1872368, dated Sep. 20, 2019, eight pages.

\* cited by examiner

*Primary Examiner* — Tye William Abell
(74) *Attorney, Agent, or Firm* — Nixon & Vanderhye P.C.

(57) ABSTRACT

An aircraft portion having a floor and a fuselage structure forming an arch above the floor is disclosed in which a monument is mounted within the fuselage. The monument is suspended from the fuselage structure by at least one suspension point, so that most of the weight of the monument is taken up by the fuselage structure. The monument includes a circular or a round section configured to take up the vertical forces than the horizontal floor, which bends under vertical loads.

12 Claims, 4 Drawing Sheets

AIRCRAFT PORTION COMPRISING A SUSPENDED ITEM OF FURNITURE EQUIPMENT

CROSS REFERENCE TO RELATED APPLICATION

This application claims priority to and incorporates by reference French Patent Application Number 1872368, filed Dec. 5, 2018.

BACKGROUND

1. Field of the Invention

The disclosure generally relates aircraft cabins and, more specifically, to interior furnishing and monument installation of the aircraft.

2. Description of the Related Art

The interior of an aircraft, in particular of a commercial passenger-carrying aircraft, constitutes a highly restricted environment in terms of space. In order to enable this environment to be properly organized, and for the comfort of the passengers and the crew, the aircraft are generally fitted with a certain amount of furniture equipment.

This furniture equipment particularly includes the toilet modules, which are formed by a module comprising partitions, an entrance door, and the sanitary installations in the internal space of the module. This furniture equipment also includes assemblies that are commonly called "galleys" and which correspond to items of furniture that are particularly used to accommodate the food trolleys intended for the passengers, before and after their contents are distributed.

These items of furniture equipment differ from simple internal equipment in that they are in the form of modules that extend from the floor or bridge of the cabin up to a ceiling of the cabin. They are generally considered to be conventional items of furniture equipment and are installed, mounted, during the interior furnishing of the aircraft. They are thus brought into the cabin and are placed on the floor at the location intended for their installation. The items of furniture equipment are fixed to the floor, for example, at four points. The items of furniture equipment are subsequently connected to the structure of the fuselage in order to stabilize them and to prevent any movement, in particular any movement on the floor.

For example, EP 2436599 relates to fixing of interior equipment and to the connection of items of aircraft furniture equipment to an aircraft structure using adjustable connection means. This reference particularly describes the connection between the upper part of an item of aircraft furniture equipment and a fuselage structure, in order to stabilize the furniture equipment that is placed on the floor of the aircraft.

This type of conventional assembly nevertheless can be optimized in a much more fundamental manner, by better taking into account the aeronautical context in which any mass or space saving is important. More specifically, the assembly mode that is known in the prior art, which assumes that the floor is sized and shaped to support the weight of the items of furniture equipment that are placed thereon, can be optimized with a view to reducing the mass of the aircraft and/or in order to maximize the useful space of the items of furniture equipment.

SUMMARY

The present disclosure thus aims to improve the assembly of the items of furniture equipment of an aircraft portion or inside the aircraft cabin for the aforementioned purposes.

The present invention encompasses an aircraft portion comprising a floor, a fuselage structure forming an arch above the floor, and an item of furniture equipment extending at least from the floor to the fuselage structure forming an arch. The item of furniture equipment is suspended from the fuselage structure forming an arch by at least one suspension point, so that most of the weight of the item of furniture equipment is taken up by the fuselage structure forming an arch.

The mounting configuration results in distributing the forces exerted in the connections between an item of furniture equipment and the structures to which it is connected, namely the floor and the fuselage structure forming an arch above the floor, which differs from the distribution known in the prior art.

According to the configuration more than half of the weight of the furniture equipment or monument may be supported by the fuselage structure forming an arch from which the furniture equipment is suspended.

Whereas in the known prior art, the weight of the item of furniture equipment is basically taken up at the level of the floor. That is, most or even all of the forces that are exerted on the furniture equipment in response to its weight and other vertical forces are exerted at the connections between the equipment and the floor. That is, the majority of the weight of the monument is carried by the cabin floor inside the aircraft fuselage. The present invention proposes suspending the furniture equipment from the fuselage structure forming an arch, that is, for example, the interior of the aircraft fuselage, so that most of the forces that are exerted on the item of furniture equipment in response to its weight are exerted at the connections between the equipment and the fuselage structure forming an arch.

The force that must be supported by the floor is thus significantly reduced, even removed, when the item of furniture equipment is only subject to its own weight. This allows the sizing of the floor and of the structure supporting the floor to be reduced. A mass saving is thus obtained with respect to the structure of the floor. Furthermore, the fuselage structure is generally sized and configured (due to its round, arch shape) in order to support significant loads. Its possible reinforcement (if this proves to be necessary) for supporting the weight of the item of furniture equipment would lead to a possible increase in the mass of the structure that is much less than the saving obtained on the floor. Furthermore, the proposed invention can enable spaces to be freed up under the floor that can be used for purposes other than mechanically supporting the floor.

According to an exemplary embodiment, the entire mass of the item of furniture equipment can be taken up by and transferred to the fuselage structure.

The fuselage structure may comprise a plurality of frames, and the item of furniture equipment can be suspended from at least one frame.

The item of furniture equipment may be suspended from the fuselage structure by three suspension points. One suspension point may comprise a rigid connection between the item of furniture equipment and the aircraft structure, and the other two suspension points may each comprise a suspension connecting rod interposed between the item of furniture equipment and the fuselage structure.

The item of furniture equipment can be connected to the fuselage structure or to the floor by at least two connecting rods orthogonal to each other, extending substantially parallel to a plane of extension of the floor.

The item of furniture equipment may have a general box-type shape and configuration, comprising a lower panel, which extends at the level of the floor or to a level located under the floor, and panels orthogonal to the lower panel.

The item of furniture equipment can be a toilet module or a galley type furniture assembly.

The aircraft portion may comprise two items of furniture equipment, with the items of furniture equipment being connected together by at least one intermediate connecting rod parallel to the plane of extension of the floor.

The aircraft portion may be a fuselage nose cone comprising a cockpit, with an item of furniture equipment being disposed on either side of an aisle for accessing the cockpit, a side panel of each item of furniture equipment being adjoined to a rear partition of the cockpit.

The disclosure also relates to an aircraft comprising a fuselage portion as previously described.

Further features and advantages of the invention will become more clearly apparent from the following description.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale, emphasis instead being placed upon illustrating particular principles, discussed below.

DETAILED DESCRIPTION OF EMBODIMENTS

Some embodiments will now be described with reference to the Figures.

Figure 1:
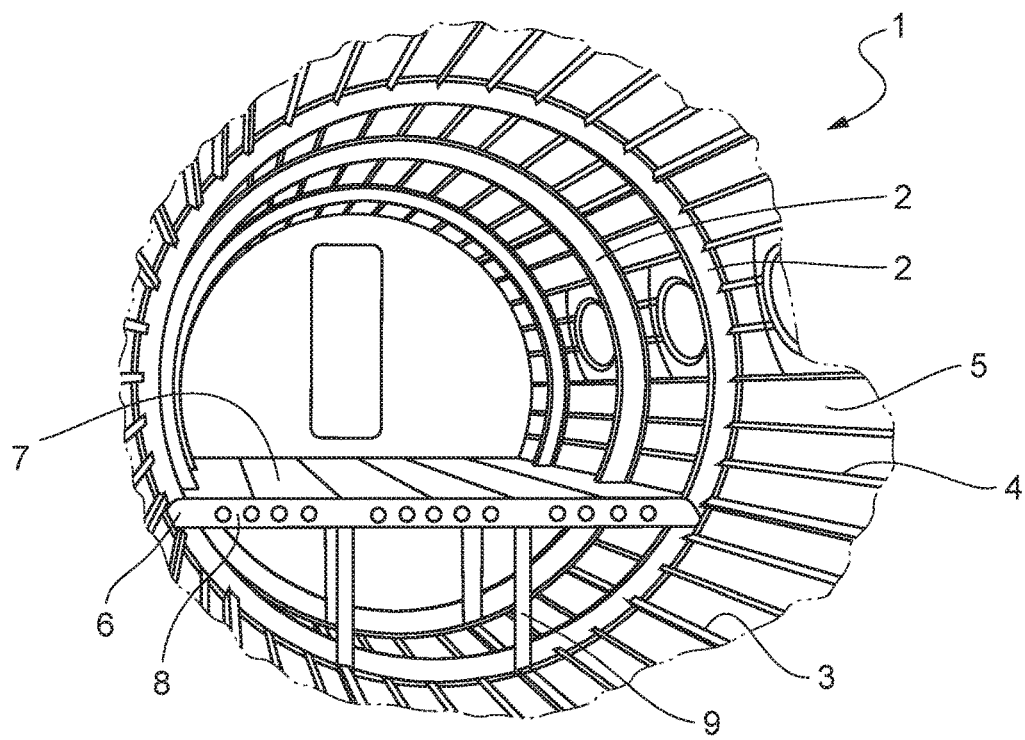
FIG. 1 is a partial three-dimensional schematic view of an aircraft fuselage portion.

Referring to FIG. 1, a partial three-dimensional schematic view of an aircraft fuselage portion is illustrated. An aircraft fuselage generally has a substantially cylindrical elongated shape. The fuselage comprises a fuselage structure 1, which forms the main framework that provides the fuselage with its strength and rigidity. The fuselage structure 1 comprises frames 2, connected together by a plurality of spars 3 and stringers 4.

The frames 2 are closed-shaped, for example, circular, oval or ovoid, structural elements. The frames provide the fuselage with its cross-section shape. The spars 3 and the stringers 4 are structural elements that extend longitudinally, that is, in the general direction of extension of the fuselage. The spars 3 and the stringers 4 are connected to the frames 2 in order to form the framework of the fuselage, to which a skin 5 is applied.

Other forms of fuselage can be implemented, for example, comprising frames, on which a skin is applied that is reinforced by ribs or that has a cellular structure, for example, of the ISOGRID structural components. The invention is thus applicable to numerous aircraft fuselage portion architectures.

The aircraft portion also comprises a floor 6. The floor 6 corresponds to a rigid structure that is substantially horizontal when the aircraft is on the ground. The floor 6 comprises an upper surface 7, on which the passengers, including the crew members, of the aircraft can walk. The aircraft cabin is formed between the floor and the ceiling of the aircraft, with the ceiling generally being formed under the fuselage structure 1, which forms an arch above the floor 6.

Under the upper surface 7 of the floor 6, a floor structure 8 grants the floor 6 the necessary strength and rigidity. In order to prevent the structure 6 from bending or from substantially bending, under the vertical loads that it has to support, braces 9 are disposed under the floor extending between a lower surface of the floor and the fuselage structure 1. In particular, the braces 9 generally bear against the frames 2 of the fuselage structure 1 or against structures located under the floor, for example, a landing gear unit, that are adapted to take up the imposed loads. The vertical loads applied to the floor 6 are basically associated with the weights of the items of equipment placed on the floor 6 and to the weight of the passengers.

Figure 2:
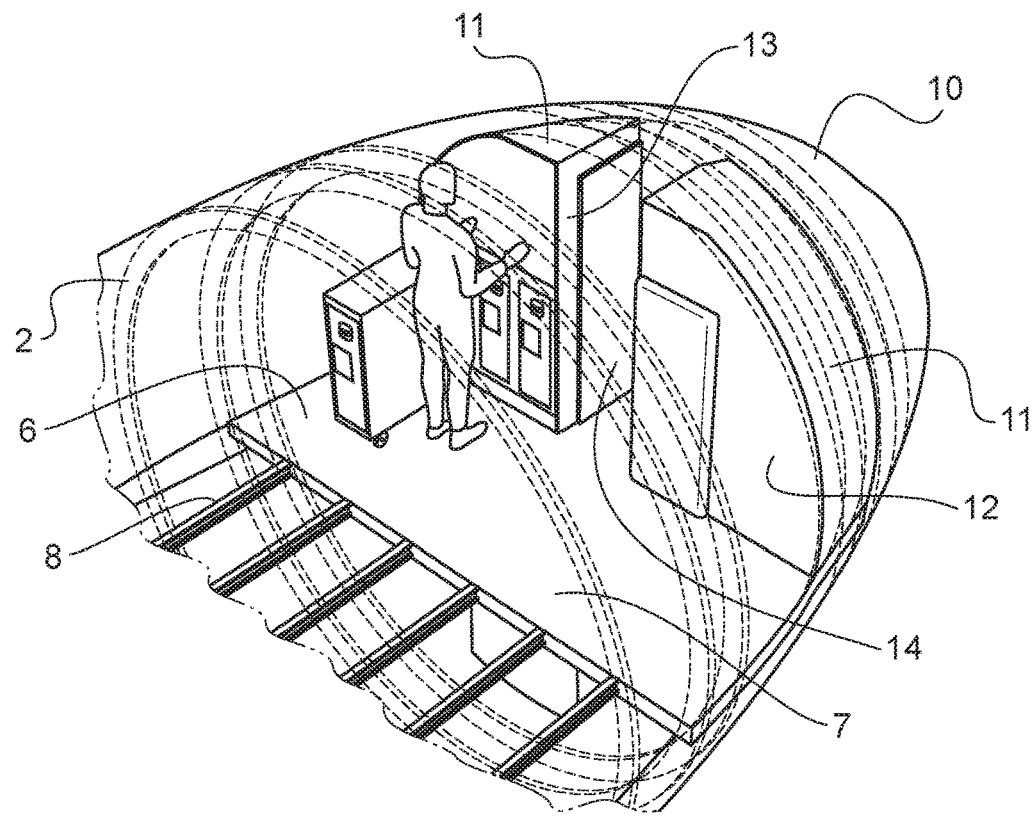
FIG. 2 is a three-dimensional schematic view of a fuselage nose cone of an aircraft illustrating interior furnishing.

Referring now to FIG. 2, an aircraft fuselage portion, for example, a fuselage nose cone is illustrated. The nose cone comprises a cockpit 10, which is separated from the rest of the aircraft cabin by a partition, behind which two items of furniture equipment 11 are generally installed. A first item of furniture equipment, for example, is a lavatory module or monument 12. The lavatory monument comprises partitions, an entrance door and sanitary equipment in the internal space defined by the partitions. A second item of furniture equipment, for example, is an item of furniture for accommodating trolleys containing, for example, the food for the passengers, with this item of furniture equipment generally being called "galley" equipment. In the fuselage portion that is shown, the lavatory monument 12 and the galley equipment 13 are disposed on either side of an aisle 14 granting access to the cockpit 10.

The items of furniture equipment, within the meaning of the present invention, correspond to all the equipment for the interior furnishing of an aircraft, which equipment is in the form of an item of furniture or of a module that extends vertically between the floor 6 and the ceiling of the cabin. It therefore basically involves, as previously stated, lavatories and galleys, and can also relate to certain specific furniture items or monuments, for example, bunks intended for the pilot or cabin crew, or various large storage cupboards.

According to a conventional assembly, and as known from the prior art, the items of furniture equipment are placed on the floor 6, to which they are fixed where appropriate, they are then connected to the fuselage structure 1 in order to stabilize them. This assumes that the floor supports all, or nearly all, of the weight of the item of furniture equipment that is installed thereon. The weight corresponds to the vertical force that is exerted on the floor under the gravitational force of the earth, when the aircraft is on the ground and stationary. More generally, the floor is sized to support the forces exerted by the furniture equipment, which can vary depending on the vertical accelerations experienced by the aircraft in flight.

Figure 3:
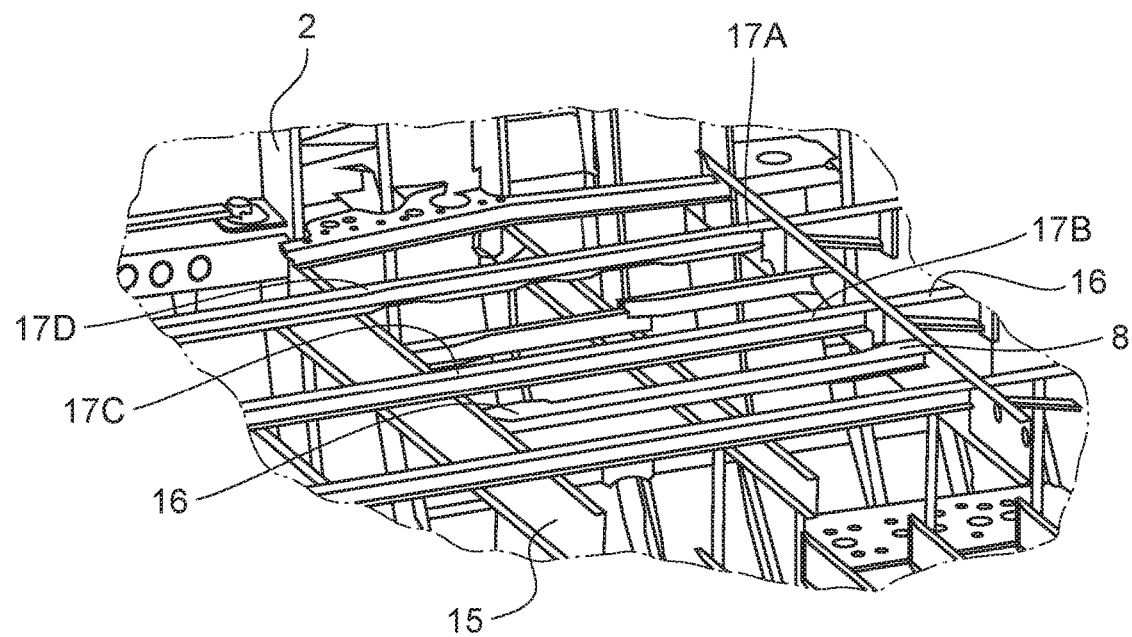
FIG. 3 is a detailed partial three-dimensional view of a floor structure of an aircraft.

Referring to FIG. 3 a partial detailed view of a floor structure 8 of an aircraft adapted to receive an item of furniture equipment is illustrated. The floor structure 8 comprises a plurality of transverse beams 15 each connected at each end to frames 2 of the fuselage structure 1. The beams 15 are designed to withstand bending under significant loads. Longitudinally, joists 16, similar to the struts of a conventional floor, are in abutment on or rigidly connected to the beams. Horizontal panels are fitted and fixed to this floor structure to allow the passengers to walk thereon. The items of furniture equipment or monuments are placed and fixed on the floor 6. For example, a reinforced zone of the floor 6 (through the presence of numerous joists 16) designed to receive an item of furniture equipment is illustrated. The floor structure 8 shown is intended to accommodate an item of furniture equipment or monument comprising a rectangular lower panel, which is placed on the floor 6 and is fixed to the floor at its four corners, at four fixing points 17A, 17B, 17C and 17D.

Figure 4:
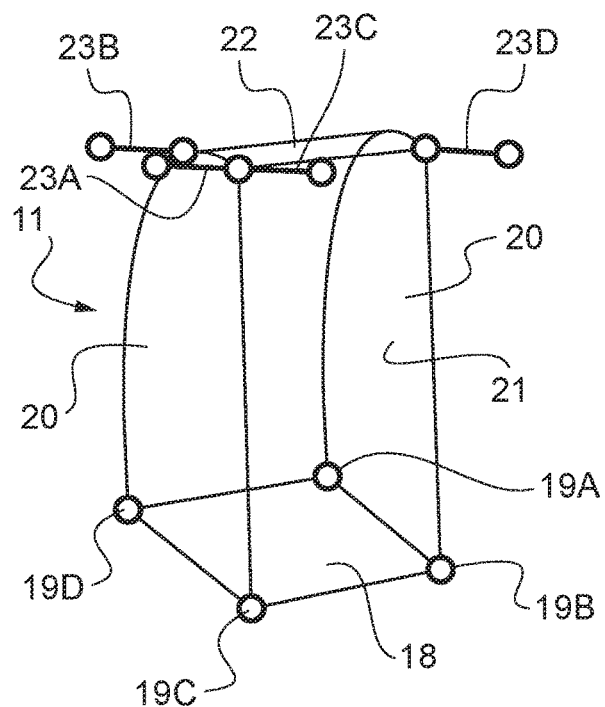
FIG. 4 is a schematic diagram of the connections implemented to fix a furniture assembly in an aircraft.

Referring to FIG. 4, a perspective view of an item of furniture equipment 11, the connections implemented so that it can be assembled in the cabin of an aircraft according to the prior art is illustrated. The item of furniture equipment 11 is represented by its outer edges, which define the general shape. It has a lower panel 18 placed on the floor 6 and fixed thereto by four rigid connections 19A, 19B, 19C and 19D, that are made, for example, at the four fixing points 17A, 17B, 17C and 17D shown in FIG. 3.

The item of furniture equipment 11 further comprises two side panels 20, a front panel 21 (which, in the case of a lavatory module, is provided with an entrance door), a rear and upper panel 22, the curvature of which advantageously corresponds to that of the fuselage structure, in order to optimize the use of the space available in the aircraft cabin. In the upper part of the item of furniture equipment, i.e. opposite the lower panel 18, four anti-tilt connecting rods 23A, 23B, 23C, 23D connect the item of furniture equipment 11 to the fuselage structure 1.

Two anti-tilt connecting rods 23A, 23B are oriented in order to take up the longitudinal forces, and two other anti-tilt connecting rods 23C, 23D are oriented so as to take up the transverse forces. Indeed, two connecting rods per direction are generally required due to the low torsional rigidity of the furniture equipment. The anti-tilt connecting rods 23A, 23B, 23C, 23D do not, or only marginally, take up the vertical forces that are basically associated with the weight of the furniture equipment.

Figure 5:
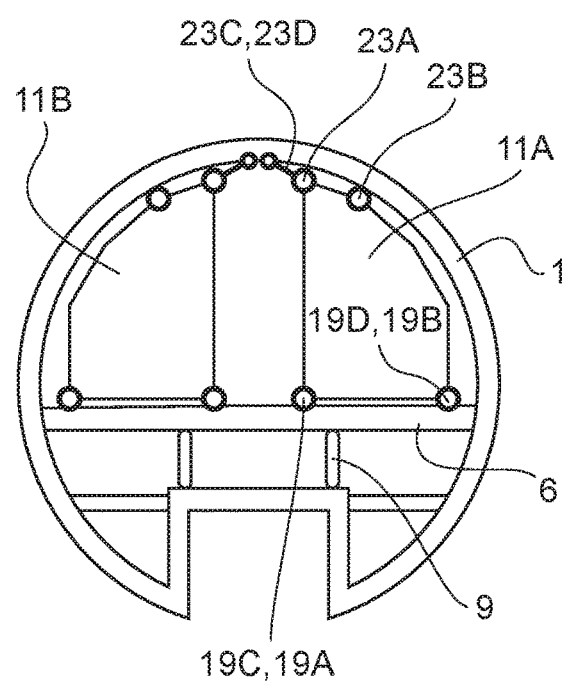
FIG. 5 is a cross-sectional view of a fuselage portion in which two items of furniture equipment are installed.

Referring to FIG. 5, a cross-section of a fuselage portion in which two installed items of furniture equipment 11A, 11B are illustrated according to the assembly described with reference to FIG. 4. The floor 6 supports most of the vertical forces applied to the items of furniture equipment, beginning with their own weight. Any bending of the floor 6 is avoided using a reinforced floor structure 8 and braces 9 interposed between the floor and the structural elements able to take up the vertical load, in this case a front landing gear unit.

Figure 6:
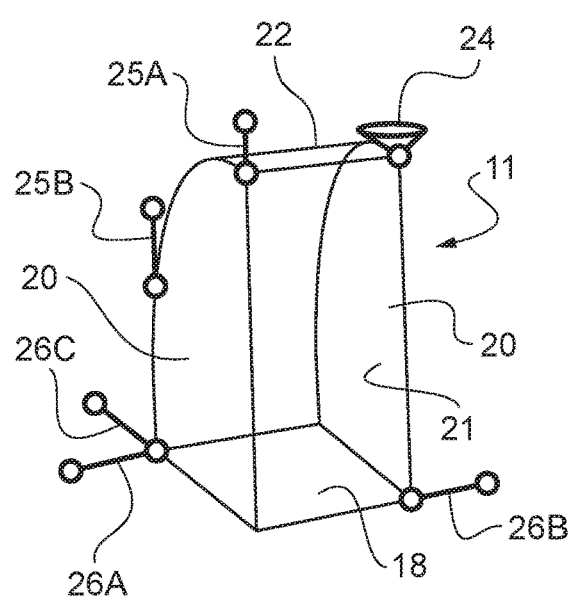
FIG. 6 illustrates the connections that are implemented to fix an item of furniture equipment in an aircraft in accordance with an exemplary embodiment of the invention.

Referring to FIG. 6, a perspective of an item of furniture equipment 11 is illustrated in which the connections implemented in order for it to be assembled in the cabin of an aircraft according to an exemplary embodiment. The item of furniture equipment 11 is represented by its outer edges, which define the general shape. It has a lower panel 18, two side panels 20, a front panel 21 (which, in the case of a toilet module, is provided with an entrance door), and a rear and upper panel 22, the curvature of which advantageously corresponds to that of the fuselage structure in order to optimize the use of the space available in the aircraft cabin. The item of furniture equipment 11 is suspended from the fuselage structure by a set of connections. The term "suspended" is understood to mean that most, if not all, of the weight of the item of furniture equipment is supported at the connections with the fuselage structure.

In particular, the item of furniture equipment 11 is connected to the fuselage structure by at least one suspension point. In the example shown, the item of furniture equipment is suspended from the fuselage structure by three suspension points. A rigid connection 24 is produced between an upper point of the item of furniture equipment 11 and the fuselage structure 1, or for example at a frame 2. In this case, the rigid connection 24 is produced at a first upper corner formed between the front panel 21, a side panel 20 and the rear and upper panel 22. A rigid connection in this case denotes, as is commonly the case in mechanics, a connection without any degree of freedom. A first suspension connecting rod 25A connects the item of furniture equipment and the fuselage structure at the second upper corner (opposite the first upper corner) of the furniture assembly 11. A third suspension connecting rod 25B is provided, located in a transverse plane separate from that of the rigid connection 24 and of the first suspension connecting rod 25A.

The suspension connecting rods 25A, 25B are sized and oriented so as to be able to take up the vertical forces applied on the item of furniture equipment 11 (namely due to its own weight as well as to the vertical accelerations that it can experience in addition to the gravitational force of the earth).

In the lower part of the item of furniture equipment 11, three connecting rods 26A, 26B and 26C connect the item of furniture equipment 11 to the floor 6 or to the fuselage structure 1. The connecting rods 26A, 26B and 26C are configured, in particular oriented, so as to jointly or individually take up longitudinal and transverse forces, i.e. forces applied to the item of furniture equipment 11 in a plane parallel to the plane of extension of the floor 6. In particular, in the example shown, two connecting rods 26A, 26B are configured to take up longitudinal forces (which are significant during the accelerations and decelerations of the aircraft, for example, in the take-off and landing phases). The connecting rod 26C is configured to take up transverse forces.

Thus, the floor 6 essentially does not support, or only slightly supports vertical forces or the weight orthogonal to its surface. The connecting rods 26A, 26B and 26C basically transfer forces thereto in the plane of extension of the floor. These forces can be broken down into a longitudinal component and a transverse component that the longitudinal joists 16 and the transverse beams 15 are well adapted to take up, by working in traction or compression.

Figure 9:
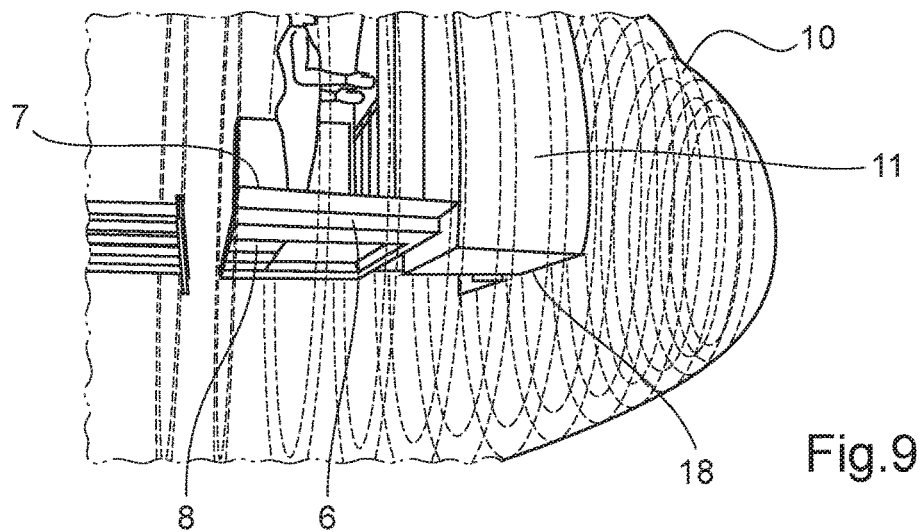
FIG. 9 is a partial three-dimensional schematic view of an aircraft nose cone.

In some configurations, the lower panel 18 may not be in contact with the floor 6. This is the case when the lower panel 18 is kept suspended above the upper surface 7 of the floor 6. This is also the case when there is no floor 6 under the item of furniture equipment 11. In this case, the lower panel 18 can extend at the level of the remainder of the floor 6, for example, in order to provide a continuous surface between the upper surface 7 and an upper surface of the lower panel 18, or the lower panel can extend under the level of the floor 6. Such a configuration, in which the lower panel 18 extends under the floor 6, is illustrated in FIG. 9.

In addition to the mass saving associated with removing or lightening the floor under the item of furniture equipment 11, the configurations in which the item of furniture equipment is not in direct contact with the upper surface 7 of the floor 6 limit the risk of corrosion at this level.

Furthermore, the embodiment shown in FIG. 6 implements six connections, which must be formed during the integration of the item of furniture equipment, as opposed to eight connections in a conventional assembly according to FIG. 4. Moreover, some embodiments facilitate, where appropriate, an isostatic assembly of the items of furniture equipment in an aircraft. It is to be noted that a suspended assembly in accordance with an exemplary embodiment that does not require a support floor uses the resistance of some constituent panels of the items of furniture equipment 11. Nevertheless, the flat panels that are used are generally able to transfer significant loads in their plane of extension.

For a lavatory module, all the panels are adapted to bear loads exerted in their plane, except, where appropriate, the front panel 21, which is mechanically weakened by the opening intended to accommodate the entrance door. For a galley, all the panels are adapted to take up loads exerted in their plane, but a side face can be devoid of a side panel 20 or can comprise a panel that only partially covers the corresponding side face, to allow the introduction and the removal of a trolley and to provide the crew with a work surface.

Furthermore, the lack of support from the floor 6 can require the reinforcement of the lower panel 18 of the item of furniture equipment 11 compared to a conventional item of furniture equipment (depending on the internal loads that the item of furniture equipment has to support, for example, the weight of an individual for a toilet module). Nevertheless, this reinforcement, when it is necessary, results in an increase in mass that is much less than the mass saved on the floor structure 8.

Figure 7:
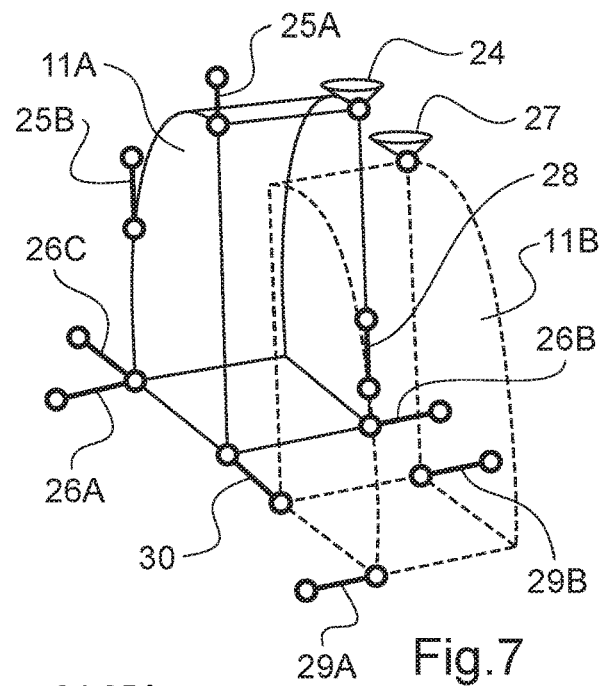
FIG. 7 illustrates the connections that implemented to fix an assembly comprising two items of furniture equipment in accordance with an exemplary embodiment of the invention.

FIG. 7 shows the connections implemented for fixing an assembly comprising two items of furniture equipment, namely a first item of furniture equipment 11A and a second item of furniture equipment 11B, according to one embodiment of the invention. The first item of equipment 11A can correspond to the item of furniture equipment 11 of FIG. 6, and is mounted according to the connection configuration described with reference to FIG. 6.

The second item of furniture equipment 11B is also mounted suspended. In order to limit the number and the complexity of the connections to be implemented, the two items of furniture equipment are considered to be an assembly and not to be two independently installed assemblies. Thus, the second item of furniture equipment 11B is suspended by a rigid connection 27 between an upper point of the second item of furniture equipment 11B and the fuselage structure 1, from a frame 2. A suspension connecting rod 28 is provided that is located in a transverse plane distinct from that of the rigid connection 27.

Two connecting rods 29A, 29B connect the item of furniture equipment 11 to the floor 6 or to the fuselage structure 11. The connecting rods 29A, 29B are configured, in particular oriented, so as to jointly or individually take up the forces applied to the second item of furniture equipment 11B in a plane parallel to the plane of extension of the floor 6. In particular, in the example shown, two connecting rods 29A, 29B are configured to take up longitudinal forces.

An intermediate connecting rod 30 transversely connects the first item of furniture equipment 11A and the second item of furniture equipment 11B. According to the embodiment that is implemented, the intermediate connecting rod 30 can be located under the floor 6 (for example, in the configuration shown in FIG. 9), through the floor structure 8, or even can be produced by an element that is also used for another function, for example, a transverse beam of the floor structure 8.

When assembling such an assembly of two items of furniture equipment, one fewer connection therefore needs to be implemented compared to the suspended fixing of two items of furniture equipment independently of one another according to the assembly shown in FIG. 6. It is also to be noted that the assembly of such an assembly, according to the example shown in FIG. 7, implements eleven connections in total, whereas a conventional assembly on a floor, shown in FIG. 4, would implement sixteen connections. Therefore, the time-saving during the final integration is significant.

Figure 8:
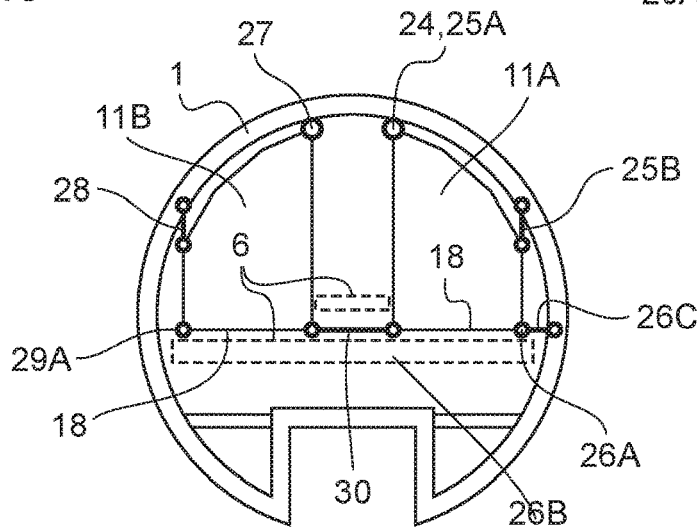
FIG. 8 illustrates a cross-section of a fuselage portion, in which an assembly as shown in FIG. 7 is installed.

FIG. 8 shows a cross-section of a fuselage portion, in which two items of furniture equipment 11A, 11B are installed, viewed as an assembly, in accordance with the assembly described with reference to FIG. 7. The following description is nevertheless applicable to the assembly of a single item of furniture equipment 11 according to the invention, for example, in accordance with the assembly described with reference to FIG. 6.

The weight of the items of furniture equipment is taken up, via the connections in the upper part, by the fuselage structure 1. The circular or round section of the fuselage has been found to be particularly well adapted for taking up and distributing the vertical forces that are applied thereto, and in particular the weight of the items of furniture equipment 11A, 11B.

Insofar as the presence of a structural floor is not necessary for supporting the items of furniture equipment in an aircraft portion according to the invention, the floor 6 used for the movement of individuals can assume various positions with respect to the items of furniture equipment 11A, 11 B.

Two examples of positions are represented by dotted lines in FIG. 8. According to a first example, the floor 6 can extend under the items of furniture equipment, and may or may not be in contact with the lower wall 18. According to a second example, the floor 6 can extend above the level of the lower wall 18.

A configuration corresponding to this second example is illustrated in FIG. 9.

As shown in FIGS. 8 and 9, insofar as the structure of the floor 6 can be lightened, and the vertical buttressing of the floor can be reduced or removed, spaces under the floor are freed up and made available. In the highly restricted space of an aircraft, and particularly in an aircraft nose cone, these spaces can be assigned to various functions. Furthermore, the freed-up spaces grant better accessibility to hardware, in particular to the system interfaces of the items of furniture equipment.

Figure 10A:
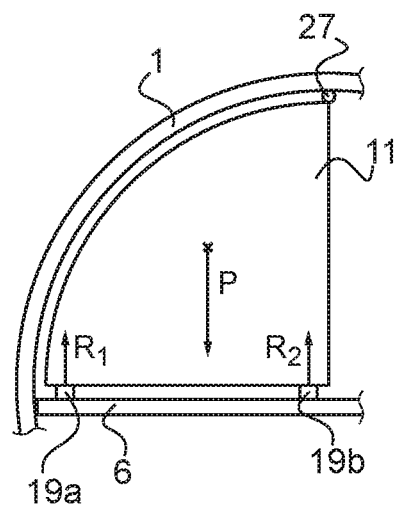
FIGS. 10a and 10b schematically illustrate the distribution of the reaction forces to the weight of an item of furniture equipment according to an installation in accordance with the prior art (FIG. 10a) and according to an exemplary embodiment (FIG. 10b), respectively.
Figure 10B:
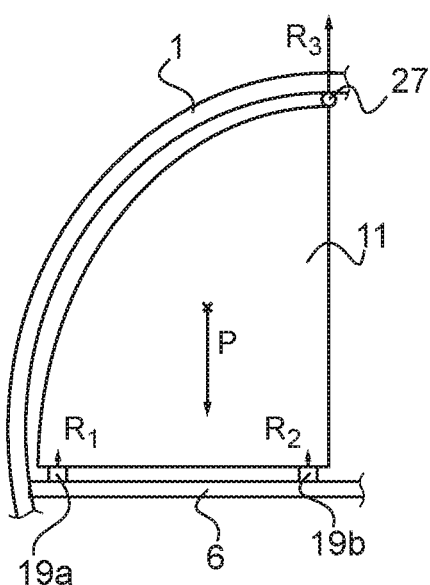

FIGS. 10a and 10b compare the distribution of the reaction forces opposing the weight of the item of furniture equipment, between an installation according to the prior art (FIG. 10a) and an installation according to one embodiment of the invention (FIG. 10b). In FIG. 10a, an item of furniture equipment 11 is installed in an aircraft fuselage comprising a fuselage structure 1 forming an arch and a floor 6. The item of furniture equipment 11 has a weight $\vec{P}$, which can be modelled by a vertical force exerted at the centre of gravity of the item of furniture equipment 11.

According to an installation according to the prior art, the item of furniture equipment 11 is basically placed on a floor 6. For the sake of simplification, in the example of FIG. 10a, the item of furniture equipment is considered to be installed on the floor 6, to which it is connected by two rigid connections 19A, 19B. The weight $\vec{P}$ is thus taken up on the floor 6 via the rigid connections 19A, 19B, in the vicinity of which a first reaction force $\vec{R1}$ and a second reaction force $\vec{R2}$ are respectively exerted, which are vertical and opposite the weight $\vec{P}$, and such that $\vec{R1} + \vec{R2} + \vec{P} = \vec{0}$.

Thus, according to the prior art, substantially all of the weight of the item of furniture equipment is taken up at the connections with the floor 6, to which this weight is transferred by these connections.

A connection 27 is formed between an upper point of the item of furniture equipment and the fuselage structure 1. However, according to the prior art, this connection is configured to basically take up the horizontal, longitudinal and transverse forces (exerted in directions parallel to the plane of extension of the floor 6) and not the vertical forces such as the weight $\vec{P}$, for example. The connection 27 thus prevents the item of furniture equipment 11 from moving or tilting.

FIG. 10b also shows an item of furniture equipment 11, which is installed in an aircraft fuselage comprising a fuselage structure 1 forming an arch and a floor 6. The weight $\vec{P}$ of the item of furniture equipment 11 can be modelled by a vertical force exerted at the centre of gravity of the item of furniture equipment 11.

As in the example of FIG. 10a, the item of furniture equipment is connected to the floor 6 by two rigid connections 19A, 19B, and is connected to the fuselage structure 1 forming an arch by a connection 27 that is formed at an upper point of the item of furniture equipment.

The connection 27, for example, a rigid connection (i.e. without any degree of freedom), is configured so that it transfers most of the weight $\vec{P}$ of the item of furniture equipment 11 to the fuselage structure 1. Thus, a reaction force $\vec{R3}$ is exerted in the connection 27, opposite the weight $\vec{P}$, and such that $|\vec{R3}| \geq |\vec{P}|/2$.

If all the weight $\vec{P}$ is taken up in the connection 27, then $\vec{P} + \vec{R3} = \vec{0}$. Otherwise, a small part of the weight can be applied on the floor 6 via the connections 19A and 19B, in which reaction forces $\vec{R1}$ and $\vec{R2}$ are exerted, opposite the weight $\vec{P}$, such that $\vec{P} + \vec{R3} + \vec{R1} + \vec{R2} = \vec{0}$, with $|\vec{R3}| \geq |\vec{P}|/2$, which implies that $|\vec{R3}| \geq |\vec{R1} + \vec{R2}|$.

Of course, the balance of the forces presented in FIG. 10b is highly simplified and limited to taking up the weight of the item of furniture equipment. The illustrated principle is also applicable to the other vertical forces that must be taken up due to the vertical accelerations (other than gravity) experienced by the item of furniture equipment. The proposed simplified representation enables the subject matter of the invention to be illustrated, but numerous other installation configurations are possible. In particular, the connection 27 can be configured to take up all or some of the torque created by $\vec{P}$ and $\vec{R3}$, as well as the horizontal forces exerted on the item of furniture equipment. Other connections can be created for suspending the item of furniture equipment 11 from the fuselage structure 1, so that the weight (or at the very least most of the weight) taken up by the item of furniture equipment 11 is distributed between the various connections providing this suspension ($\vec{R3}$ is then the resultant of the forces opposing the weight that are exerted in these connections). The distribution of the suspension connections can also prevent the creation of a torque that tends to cause the furniture equipment to tilt under the effect of a vertical acceleration.

The disclosure thus proposes a suspended assembly of the items of furniture equipment in an aircraft. This allows the structure of the floor to be lightened and simplified. The integration of the items of furniture equipment is simplified, particularly by virtue of a reduction in the number of connections to be implemented during assembly. Spaces under the floor are freed up for other functions than for mechanical support, and facilitate access, for example, to the interfaces (for example, electrical, electronic, hydraulic, water circuit connections, etc.) of the items of furniture equipment. Finally, this general simplification facilitates the modular constitution of an aircraft, i.e. the assembly of modules corresponding to pre-assembled sub-assemblies in a structural part of an aircraft. Within this context, the limitation of the number of connections to be formed and the improvement in the accessibility that is offered in the invention is advantageous. The invention has a particularly advantageous application in the constitution of a nose cone of an aircraft fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft portion, comprising:
   a floor;
   a fuselage structure forming an arch above the floor;
   an item of furniture equipment, comprising a mass, extending at least from the floor to the fuselage structure forming an arch; and,
   wherein the item of furniture equipment is suspended from the fuselage structure forming an arch by at least one suspension point, and
   wherein substantially all the mass of the item of furniture equipment is taken up by the fuselage structure forming an arch.

2. The aircraft portion according to claim 1, wherein the entire mass of the item of furniture equipment is taken up by the fuselage structure forming an arch.

3. The aircraft portion according to claim 1, wherein the fuselage structure forming an arch comprises a plurality of frames, the item of furniture equipment being suspended from at least one frame.

4. The aircraft portion according to claim 1, wherein the item of furniture equipment has a box-type form comprising a lower panel extending at a level of the floor or to a level located under the floor, and panels orthogonal to the lower panel.

5. The aircraft portion according to claim 1, wherein the item of furniture equipment is a lavatory module or a galley.

6. The aircraft portion according to claim 1, further comprising two items of furniture equipment, wherein the items of furniture equipment are connected together by at least one intermediate connecting rod parallel to the plane of extension of the floor.

7. The aircraft portion according to claim 6, wherein the aircraft portion is a fuselage nose cone comprising a cockpit with an item of furniture equipment being disposed on either side of an aisle for accessing the cockpit, a side panel of each item of furniture equipment being adjoined to a rear partition of the cockpit.

8. The aircraft portion according to claim 1, wherein the item of furniture equipment is suspended from the fuselage structure forming an arch by three suspension points.

9. The aircraft portion according to claim 8, wherein one suspension point comprises a rigid connection between the item of furniture equipment and the aircraft structure, and the other two suspension points each comprise a suspension connecting rod interposed between the item of furniture equipment and the fuselage structure.

10. The aircraft portion according to claim 9, wherein the item of furniture equipment is also connected to the fuselage structure forming an arch or to the floor by at least two connecting rods orthogonal to each other, extending substantially parallel to a plane of extension of the floor.

11. An aircraft, comprising:
a fuselage,
a floor structure attached to the fuselage,
a monument, comprising a mass, having an upper portion and a lower portion,
wherein the lower portion is in contact with the floor structure, and
wherein the upper portion includes a suspension point attached to the fuselage supporting substantially all the mass of the monument.

12. The aircraft according to claim 11, wherein the suspension point comprises a rigid connection between the monument and the fuselage, and further comprising two additional suspension points each having a connecting rod interposed between the monument and the fuselage structure.

* * * * *